US008130090B2

(12) United States Patent
Oshiro

(10) Patent No.: US 8,130,090 B2
(45) Date of Patent: Mar. 6, 2012

(54) APPARATUS AND METHOD FOR DETECTING DECREASE IN TIRE AIR PRESSURE AND PROGRAM FOR DETECTING DECREASE IN TIRE AIR PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 343 days.

(21) Appl. No.: 12/566,283

(22) Filed: Sep. 24, 2009

(65) Prior Publication Data

US 2010/0134268 A1 Jun. 3, 2010

(30) Foreign Application Priority Data

Dec. 1, 2008 (JP) ................................. 2008-306125

(51) Int. Cl.
*B60C 23/00* (2006.01)
(52) U.S. Cl. ........................... 340/444; 340/442; 340/443
(58) Field of Classification Search .................. 340/442, 340/443, 444, 445, 449; 73/146, 146.2; 701/36, 701/45, 47, 70, 71; 702/140, 141
See application file for complete search history.

(56) References Cited

U.S. PATENT DOCUMENTS

| | | | | |
|---|---|---|---|---|
| 5,939,626 A | * | 8/1999 | Tominaga et al. | 73/146.2 |
| 5,982,279 A | * | 11/1999 | Tominaga et al. | 340/444 |
| 7,480,554 B2 | * | 1/2009 | Kajiwara | 701/70 |
| 7,705,716 B2 | * | 4/2010 | Oshiro | 340/444 |
| 8,040,229 B2 | * | 10/2011 | Kitano | 340/443 |
| 2007/0132570 A1 | | 6/2007 | Oshiro | |

FOREIGN PATENT DOCUMENTS

| | | |
|---|---|---|
| EP | 0 291 217 A2 | 11/1988 |
| JP | 56-129310 U | 3/1981 |
| JP | 63-64804 A | 3/1988 |
| JP | 63-305011 A | 12/1988 |
| JP | 62-74008 U | 5/1998 |
| JP | 2007-182211 A | 7/2007 |

OTHER PUBLICATIONS

Office Action issued Nov. 2, 2010, in corresponding Japanese Application 2008-306125.

* cited by examiner

*Primary Examiner* — Van T. Trieu
(74) *Attorney, Agent, or Firm* — Birch, Stewart, Kolasch & Birch, LLP

(57) ABSTRACT

An apparatus for detecting a decreased air pressure of a tire includes an acceleration calculation circuit for calculating, based on rotation velocity information of tires of respective wheels of a vehicle; an acceleration variation calculation circuit for calculating acceleration variations of the respective tires; a comparison circuit for comparing the acceleration variations of the respective tires; an estimation component for estimating, when a comparison result of the comparison shows that an acceleration variation of a certain tire is greater than acceleration variations of the other tires, a decrease in air pressure of the certain tire; a test circuit for determining a tire having a rotation velocity that is faster than the rotation velocities of the other tires or that is further slower than a predetermined reference; and a judgment circuit for judging, when a certain tire identified by the estimation is identical with the tire identified by the test, a decrease in air pressure of the certain tire.

6 Claims, 5 Drawing Sheets

APPARATUS AND METHOD FOR DETECTING DECREASE IN TIRE AIR PRESSURE AND PROGRAM FOR DETECTING DECREASE IN TIRE AIR PRESSURE

BACKGROUND OF THE INVENTION

1. Field of the Invention

The present invention relates to an apparatus and a method for detecting a decrease in a tire air pressure, and a program for detecting a decrease in a tire air pressure.

2. Description of the Related Art

Run flat tires can be used to enable, even when the tires are punctured and air therein is lost, a running for a distance of about 100 km. Thus, by the run flat tires, it is possible to avoid a situation where the vehicle is stopped at a dangerous place such as a road having a lot of traffic to exchange a tire or to fix the puncture. Thus, the run flat tires allow the user to drive the vehicle to the nearest service station to have the maintenance of the vehicle safely. Furthermore, the run flat tires also eliminate the need to store a spare tire in the vehicle, thus providing advantages such as an increased trunk space and improved fuel consumption by the vehicle having a lighter weight.

On the other hand, in the case of a tire like the run flat tire by which the vehicle can run even when the air pressure of the tire is zero, a conventional method focusing attention on a change in the tire rotation radius (see Japanese Unexamined Patent Publication No. 305011/1988 for example) has a difficulty in judging a decline in the air pressure. Thus, when the vehicle continuously runs at a high speed with a declined air pressure, the tires may burst.

Thus, in order to detect an abnormal air pressure of a tire when the air pressure of the tire is completely zero, a method has been suggested according to which the variations in the accelerations of the respective tires are compared (see Japanese Unexamined Patent Publication No. 2007-182211 for example).

In this method according to Japanese Unexamined Patent Publication No. 2007-182211, the variations in the acceleration of the respective tires are calculated and are compared. When the comparison result shows that a certain tire has an acceleration variation greater than those of the other tires, it is judged that the tire has an abnormal air pressure.

In the case of the method according to Japanese Unexamined Patent Publication No. 2007-182211 however, a disadvantage is caused as described below. Specifically, when a snow chain is attached to one tire among four wheels having a normal pressure, the acceleration variation calculated based on the rotation velocity of the tire with the snow chain differs from the acceleration variations calculated based on the rotation velocities of the other tires. Thus, in spite of the normal internal pressure, a wrong judgment is made that the tire with the snow chain attached thereto has an abnormal air pressure.

The present inventor has keenly researched a method to accurately detect, without issuing a false alarm as described above, that the air pressure of one wheel tire is completely zero. Through the research, the present inventor has found that, when the air pressure of one wheel tire is completely zero, there are two cases, namely a case where the tire has a rotation velocity faster than those of other tires and a case where the tire has a rotation velocity slower than those of other tires on the contrary. The present inventor has also found that the degree at which the rotation velocity becomes slower is more remarkable than in the case where a snow chain is attached to one wheel tire, thus reaching the present invention.

SUMMARY OF THE INVENTION

Specifically, it is an objective of the present invention to provide an apparatus and a method for detecting a decrease in a tire air pressure by which it can be accurately detected that the air pressure of one wheel tire is completely zero, and a program for detecting a decrease in a tire air pressure.

An apparatus for detecting a decrease in a tire air pressure according to the first aspect of the present invention (hereinafter also simply referred to as "detection apparatus") is an apparatus for detecting a decreased air pressure of a tire attached to a vehicle, comprising:

a rotation velocity detection means for periodically detecting rotation velocities of tires of the respective wheels of the vehicle;

an acceleration calculation means for calculating, based on rotation velocity information obtained from this rotation velocity detection means, accelerations of the respective tires;

an acceleration variation calculation means for calculating, based on the accelerations of the respective tires calculated by the acceleration calculation means, acceleration variations of the respective tires;

a comparison means for comparing the acceleration variations of the respective tires calculated by the acceleration variation calculation means;

an estimation means estimating, when a comparison result of the comparison means shows that an acceleration variation of a certain tire is greater than acceleration variations of the other tires, a decrease in air pressure of the certain tire;

a test means for determining, based on the tire rotation velocity information of the respective wheels, a tire having a rotation velocity that is faster than the rotation velocities of the other tires or that is further slower than a predetermined reference; and a judgment means for judging, when a certain tire identified by the estimation means is identical with the tire identified by the test means, a decrease in air pressure of the certain tire.

According to the detection apparatus of the present invention, the comparison means is used to compare acceleration variations of the respective tires. When the result of the comparison shows that a certain tire has an acceleration variation greater than acceleration variations of the other tires, based on tire rotation velocity information of the respective wheels, there is determined a tire having a rotation velocity faster than the rotation velocities of the other tires or further slower than a predetermined reference. When a certain tire identified through the comparison of the acceleration variation is identical with a tire identified through the comparison of the rotation velocity, a decrease in air pressure of the certain tire is judged. This can consequently avoid the generation of a false alarm in the case where only acceleration variations are compared. As a result, a status where the air pressure of one wheel tire is completely zero can be accurately judged.

When a decrease of a tire air pressure is judged only based on the acceleration variation of the tire, as described above, a case where a snow chain is attached to a tire of one wheel for example causes a wrong judgment in which the tire with the snow chain attached thereto has an abnormal air pressure in spite of the fact that the tire has a normal internal pressure. However, the present inventor has found that, when the air pressure of one wheel tire is completely zero, there are two cases, namely a case where the tire has a rotation velocity faster than those of other tires and a case where the tire has a rotation velocity slower than those of other tires on the contrary. The present inventor has also found that the degree at which the rotation velocity becomes slower is more remarkable than in the case where a snow chain is attached to one wheel tire. In view of this, when a tire identified through the acceleration variations of the tires is identical with a tire identified based on the rotation velocities of the tires (i.e. a tire having a speed faster or remarkably slower than those of other tires. This "slowness" is much higher than the slowness obtained when a snow chain is attached to a tire), it is judged that the certain tire has a decreased air pressure. This can consequently avoid a wrong judgment in which a tire with a snow chain attached thereto is wrongly judged to have "decrease in the air pressure" when the tire has an increased acceleration variation.

The predetermined reference can be set as a reference at which the one wheel among four wheels has a tire rotation velocity slower than the rotation velocities of the other tires when the four wheels have a normal internal pressure and a snow chain is attached to a tire of the one wheel.

A method for detecting a decrease in a tire air pressure according to the second aspect of the present invention (hereinafter also simply referred to as "detection method") is a method for detecting a decreased air pressure of a tire attached to a vehicle, comprising:

a rotation velocity detection step of periodically detecting rotation velocities of tires of the respective wheels of the vehicle;

an acceleration calculation step of calculating, based on rotation velocity information obtained in the rotation velocity detection step, accelerations of the respective tires;

an acceleration variation calculation step of calculating, based on accelerations of the respective tires calculated in the acceleration calculation step, acceleration variations of the respective tires;

a comparison step of comparing acceleration variations of the respective tires calculated in the acceleration variation calculation step;

an estimation step of estimating, when the comparison by the comparison step shows that an acceleration variation of a certain tire is greater than acceleration variations of the other tires, a decrease in air pressure of the certain tire;

a test step of determining, based on the tire rotation velocity information of the respective wheels, a having a rotation velocity that is faster than the rotation velocities of the other tires or that is further slower than a predetermined reference; and a judgment step of judging, when a certain tire identified in the estimation step is identical with the tire identified in the test step, a decrease in air pressure of the certain tire.

In the detection method of the present invention, the comparison step is used to compare acceleration variations of the respective tires. When the result of the comparison shows that a certain tire has an acceleration variation greater than acceleration variations of the other tires, based on tire rotation velocity information of the respective wheels, there is determined a tire having a rotation velocity faster than the rotation velocities of the other tires or further slower than a predetermined reference. When a certain tire identified through the comparison of the acceleration variation is identical with a tire identified through the comparison of the rotation velocity, a decrease in air pressure of the certain tire is judged. This can consequently avoid the generation of a false alarm in the case where only acceleration variations are compared. As a result, a status where air pressure of one wheel tire is completely zero can be accurately judged.

The predetermined reference can be set as a reference at which the one wheel among four wheels has a tire rotation velocity slower than the rotation velocities of the other tires when the four wheels have a normal internal pressure and a snow chain is attached to a tire of the one wheel.

A program for detecting a decrease in a tire air pressure according to the third aspect of the present invention causes, in order to detect a decreased air pressure of a tire attached to a vehicle, a computer to function as: an acceleration calculation means for calculating, based on rotation velocity information obtained from a rotation velocity detection means for periodically detecting rotation velocities of tires of the respective wheels of the vehicle, accelerations of the respective tires; an acceleration variation calculation means for calculating, based on the accelerations of the respective tires calculated by the acceleration calculation means, acceleration variations of the respective tires; a comparison means for comparing the acceleration variations of the respective tires calculated by the acceleration variation calculation means; an estimation means for estimating, when a comparison result of the comparison means shows that an acceleration variation of a certain tire is greater than acceleration variations of the other tires, a decrease in air pressure of the certain tire; a test means for determining, based on the tire rotation velocity information of the respective wheels, a tire having a rotation velocity that is faster than the rotation velocities of the other tires or that is further slower than a predetermined reference; and a judgment means for judging, when a certain tire identified by the estimation means is identical with the tire identified by the test means, a decrease in air pressure of the certain tire.

In the program for detecting a decrease in a tire air pressure according to the present invention, the comparison means is used to compare acceleration variations of the respective tires. When the result of the comparison shows that a certain tire has an acceleration variation greater than acceleration variations of the other tires, based on tire rotation velocity information of the respective wheels, there is determined a tire having a rotation velocity faster than the rotation velocities of the other tires or further slower than a predetermined reference. When a certain tire identified through the comparison of the acceleration variation is identical with a tire identified through the comparison of the rotation velocity, a decrease in air pressure of the certain tire is judged. This can consequently avoid the generation of a false alarm in the case where only acceleration variations are compared. As a result, a status where the air pressure of one wheel tire is completely zero can be accurately judged.

The predetermined reference can be set as a reference at which the one wheel among four wheels has a tire rotation velocity slower than the rotation velocities of the other tires when the four wheels have a normal internal pressure and a snow chain is attached to a tire of the one wheel.

DETAILED DESCRIPTION

Hereinafter, with reference to the attached drawings, an embodiment of a detection apparatus and method, and a program for detecting a decrease in a tire air pressure of the present invention will be described in detail.

Figure 1:
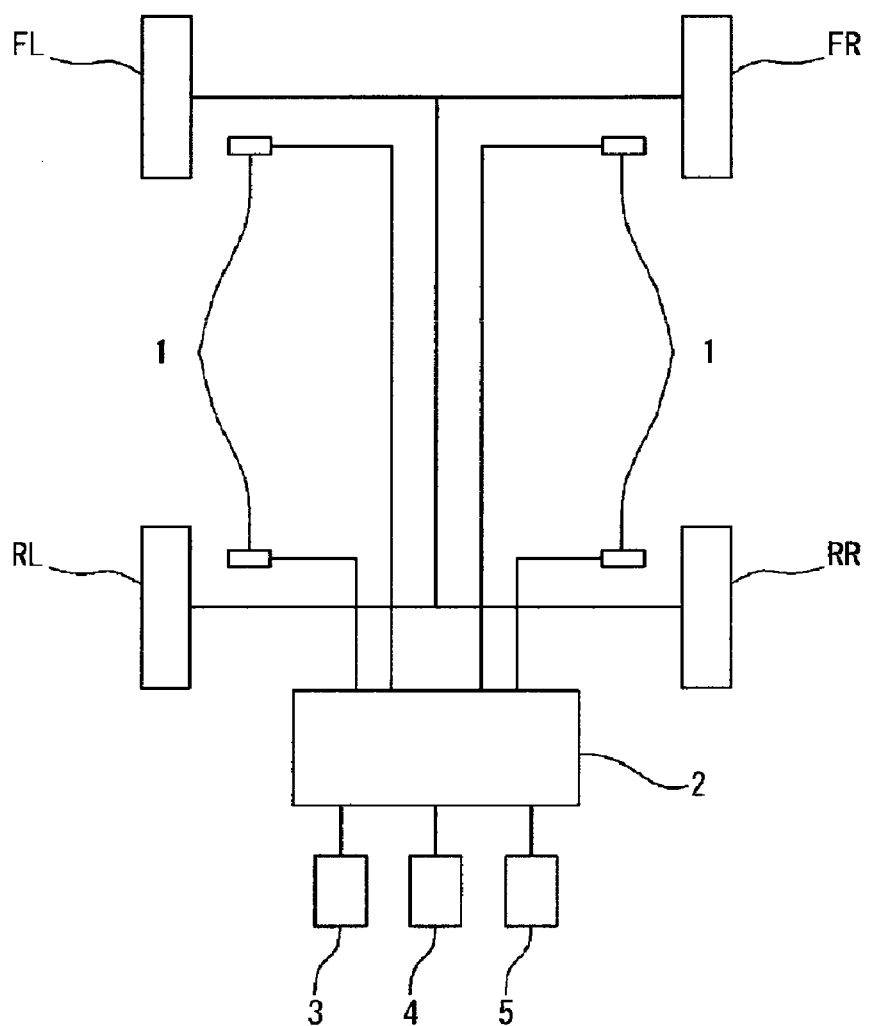
FIG. 1 is a block diagram illustrating one embodiment of a detection apparatus of the present invention.

As shown in FIG. 1, a detection apparatus according to an embodiment of the present invention includes a normal wheel speed detection means (rotation velocity detection means) 1 in order to detect the rotation velocities of four tires provided in a four-wheel vehicle (a left front wheel (FL), a right front wheel (FR), a left rear wheel (RL), and a right rear wheel (RR)). The normal wheel speed detection means (rotation velocity detection means) 1 is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as the one that generates power using rotation as in a dynamo to measure an angular velocity and a wheel speed based on this voltage. The output from the wheel speed detection means 1 is given to a control unit 2 that is a computer such as ABS. This control unit 2 is connected to a display unit 3 composed of a liquid crystal display element, a plasma display element or CRT for example for displaying a tire having a decreased internal pressure, an initialization button 4 that can be operated by a driver, and an alarming unit 5 for notifying a driver of a tire having a decreased internal pressure.

Figure 2:
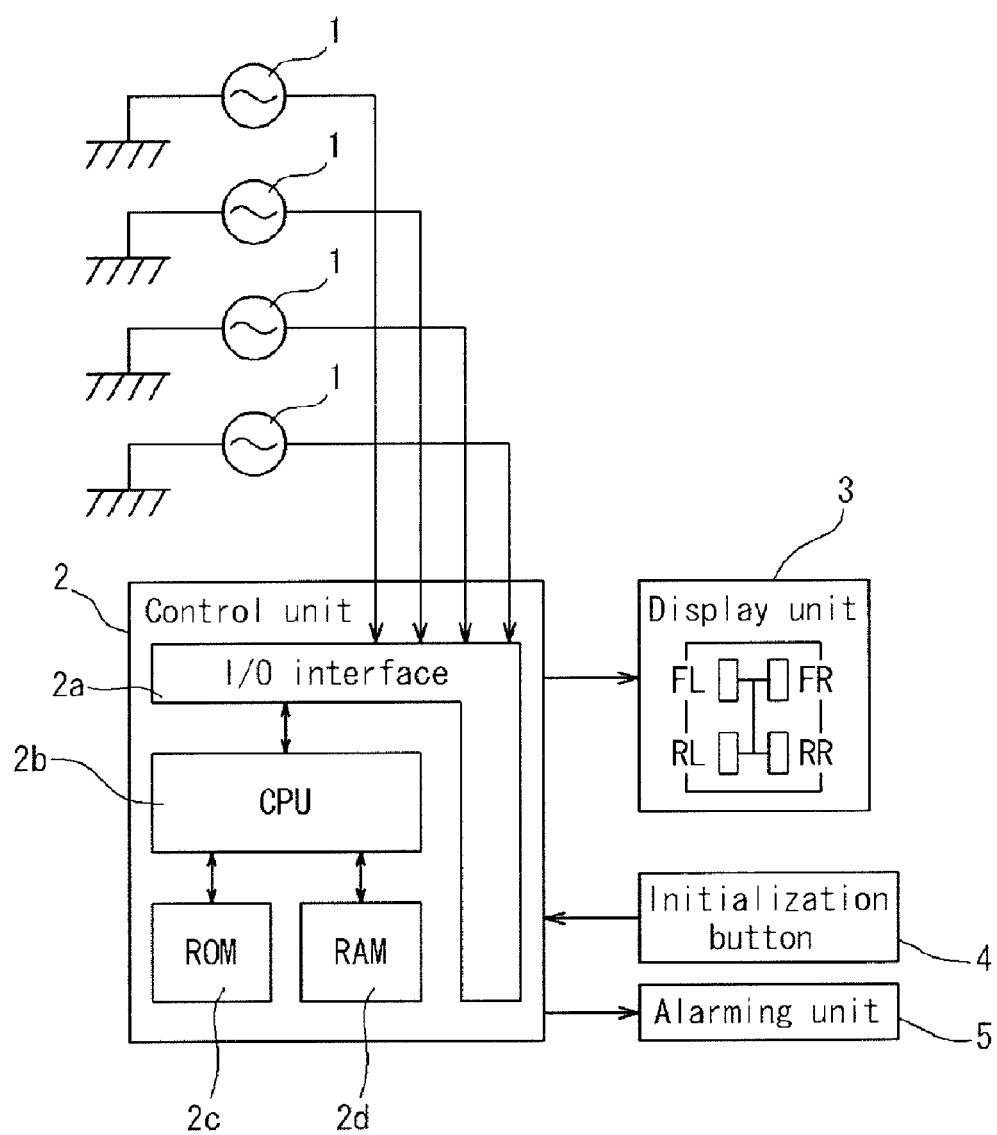
FIG. 2 is a block diagram illustrating an electric configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of this CPU 2b; and a RAM 2d to which data is temporarily written when the CPU 2b performs a control operation or from which the written data is read out.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, the angular velocity Fi of the respective tires ($F_1$ to $F_4$) at every predetermined sampling cycle $\Delta T$ (sec) (e.g., $\Delta T$=0.05 second). $F_1$ to $F_4$ represent angular velocities of a left front wheel (FL) tire, a right front wheel (FR) tire, a left rear wheel (RL) tire, and a right rear wheel (RR) tire, respectively.

Since tires are manufactured to include variations within a standard (initial difference), the effective rolling radii of the respective tires (values obtained by dividing a travel distance for one rotation by $2\pi$) are not always equal even when all of the tires have a normal internal pressure. Due to this reason, the respective tires have varied angular velocities $F_i$. Thus, there is calculated a corrected angular velocity $F1_i$ in order to cancel the variation due to the initial difference. Specifically, the correction is made as shown below.

$F1_1=F_1$ $F1_2=mF_2$ $F1_3=F_3$ $F1_4=nF_4$

The correction factors m and n are acquired by, for example, calculating the angular velocity $F_i$ based on a condition that the vehicle is running on a straight line to assume $m=F_1/F_2$ and $n=F_3/F_4$ based on this calculated angular velocity $F_i$.

Then, based on this $F_i$, the tire rotation velocity is calculated. Based on this rotation velocity, the tire acceleration is calculated.

A detection apparatus according to this embodiment is composed of: a wheel speed detection means (rotation velocity detection means) 1 for periodically detecting rotation velocities of tires of the respective wheels of the vehicle; an acceleration calculation means for calculating, based on rotation velocity information obtained from this rotation velocity detection means, accelerations of the respective tires; an acceleration variation calculation means for calculating, based on the accelerations of the respective tires calculated by the acceleration calculation means, acceleration variations of the respective tires; a comparison means for comparing the acceleration variations of the respective tires calculated by the acceleration variation calculation means; an estimation means for estimating, when a comparison result of the comparison means shows that an acceleration variation of a certain tire is greater than acceleration variations of the other tires, a decrease in air of the certain tire; a test means for determining, based on the tire rotation velocity information of the respective wheels, a tire having a rotation velocity that is faster than the rotation velocities of the other tires or that is further slower than a predetermined reference; and a judgment means for judging, when a certain tire identified by the estimation means is identical with the tire identified by the test means, a decrease in air pressure decrease of the certain tire. A program for detecting a decrease in a tire air pressure causes the control unit 2 to function as the acceleration calculation means, the variation calculation means, the comparison means, the estimation means, the test means, and the judgment means.

In the present invention, based on the accelerations of the respective tires, the acceleration variations of the respective tires are calculated. This acceleration variation is an integration value of 25 absolute values of acceleration (corresponding to 1 second) each of which is calculated at a predetermined time (e.g., 40 ms). By comparing the integration values calculated for the respective tires, it is judged, when a certain tire has an integration value different from the integration values of other tires, that the certain tire may have an abnormal air pressure (in particular, an air pressure of zero). Specifically, a tire having a decreased air pressure is assumed. The calculated acceleration variations of the respective tires are compared by calculating a ratio of the respective acceleration variations or a difference thereamong. When this ratio or difference is larger than a predetermined threshold value, judgment regarding an abnormal air pressure is performed. This threshold value can be calculated in advance by a running test of a vehicle in which one wheel of four wheels has an air pressure of zero for example.

In the present invention, based on the rotation velocity information of the tires of the respective wheels, there is further determined a tire that has a rotation velocity faster the rotation velocities of the other tires or further slower than a predetermined reference. In other words, such a tire is identified that has a rotation velocity faster than those of other three tires or further slower than a predetermined reference. This identification can be performed in the manner as described below for example.

Specifically, the rotation velocities of the respective wheels are assumed as FLs (left front wheel), FRs (right front wheel), RLs (left rear wheel), and RRs (right rear wheel) respectively. Then, DEL1_R, DEL2_R, and DEL3_R represented by the following formulae (1) to (3) are calculated and are compared with a predetermined threshold value (see table 1). By doing this, a tire having a faster rotation velocity than those of other three wheels or a much slower rotation velocity can be identified.

$$DEL1\_R=[\{(FLs+RRs)/(FRs+RLs)\}-1]\times 100(\%) \qquad (1)$$

$$DEL2\_R=[\{(FLs+FRs)/(RLs+RRs)\}-1]\times 100(\%) \qquad (2)$$

$$DEL3\_R=[\{(FLs+RLs)/(FRs+RRs)\}-1]\times 100(\%) \qquad (3)$$

TABLE 1

|  | DEL1_R | DEL2_R | DEL3_R |
|---|---|---|---|
| Slower (FR) | DEL1_R > #ThSlowerDEL1 | DEL2_R < #ThSlowerDEL2 | DEL3_R > #ThSlowerDEL3 |
| Slower (FL) | DEL1_R < #ThSlowerDEL1 | DEL2_R < #ThSlowerDEL2 | DEL3_R < #ThSlowerDEL3 |
| Slower (RR) | DEL1_R < #ThSlowerDEL1 | DEL2_R > #ThSlowerDEL2 | DEL3_R < #ThSlowerDEL3 |
| Slower (RL) | DEL1_R > #ThSlowerDEL1 | DEL2_R > #ThSlowerDEL2 | DEL3_R < #ThSlowerDEL3 |
| Faster (FR) | DEL1_R < #ThFasterDEL1 | DEL2_R > #ThFasterDEL2 | DEL3_R < #ThFasterDEL3 |
| Faster (FL) | DEL1_R > #ThFasterDEL1 | DEL2_R > #ThFasterDEL2 | DEL3_R > #ThFasterDEL3 |
| Faster (RR) | DEL1_R > #ThFasterDEL1 | DEL2_R < #ThFasterDEL2 | DEL3_R > #ThFasterDEL3 |
| Faster (RL) | DEL1_R < #ThFasterDEL1 | DEL2_R < #ThFasterDEL2 | DEL3_R > #ThFasterDEL3 |

Although the predetermined threshold value can be calculated by an experiment, threshold values for judging a tire of one wheel that has a slower rotation velocity than those of other tires because the tire has an air pressure of zero (#ThSlowerDEL1, #ThSlowerDEL2, #ThSlowerDEL3) are values within a range from 3 to 10 for example. Threshold values for judging a tire of one wheel that has a faster rotation velocity than those of other tires because the tire has an air pressure of zero (#ThFasterDEL1, #ThFasterDEL2, #ThFasterDEL3) are values within a range from 0 to 0.3 for example.

Figure 3:
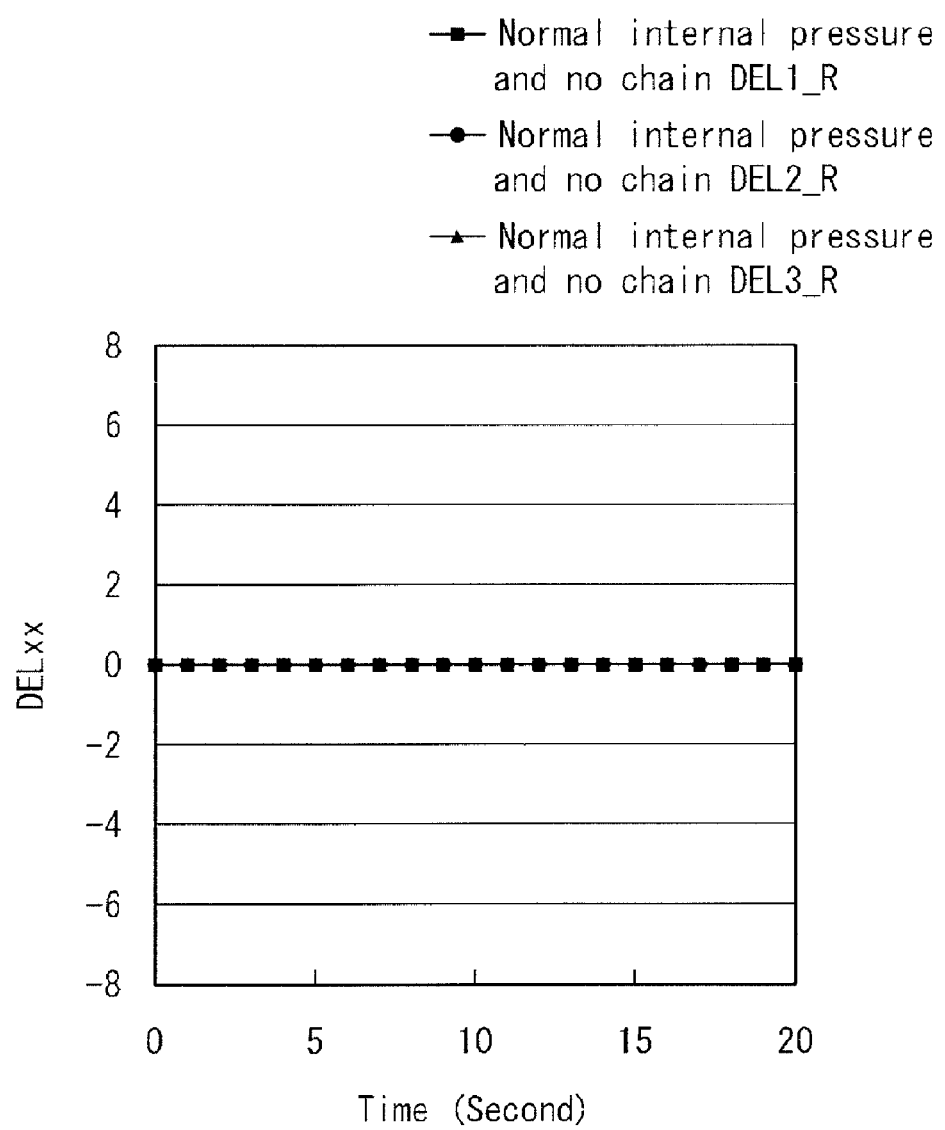
FIG. 3 illustrates a relation between DEL and time.
Figure 4:
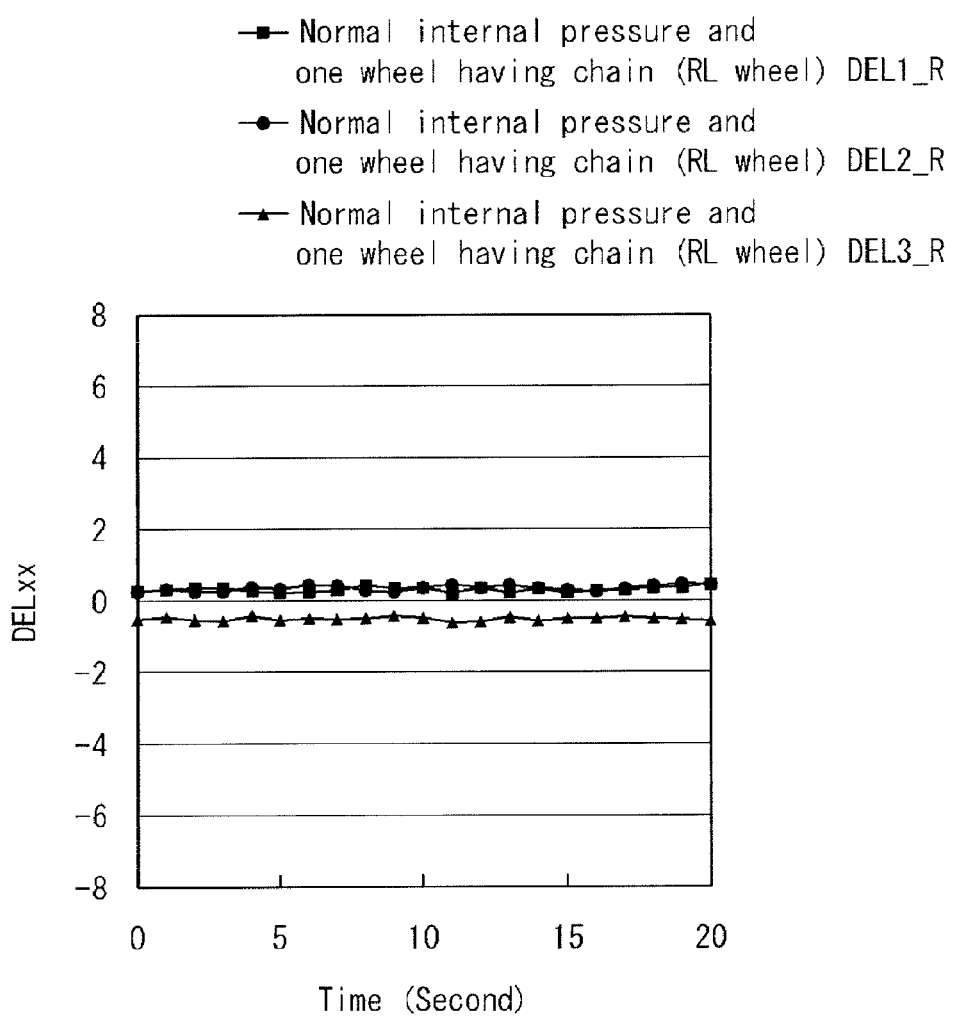
FIG. 4 illustrates a relation between DEL and time.
Figure 5:
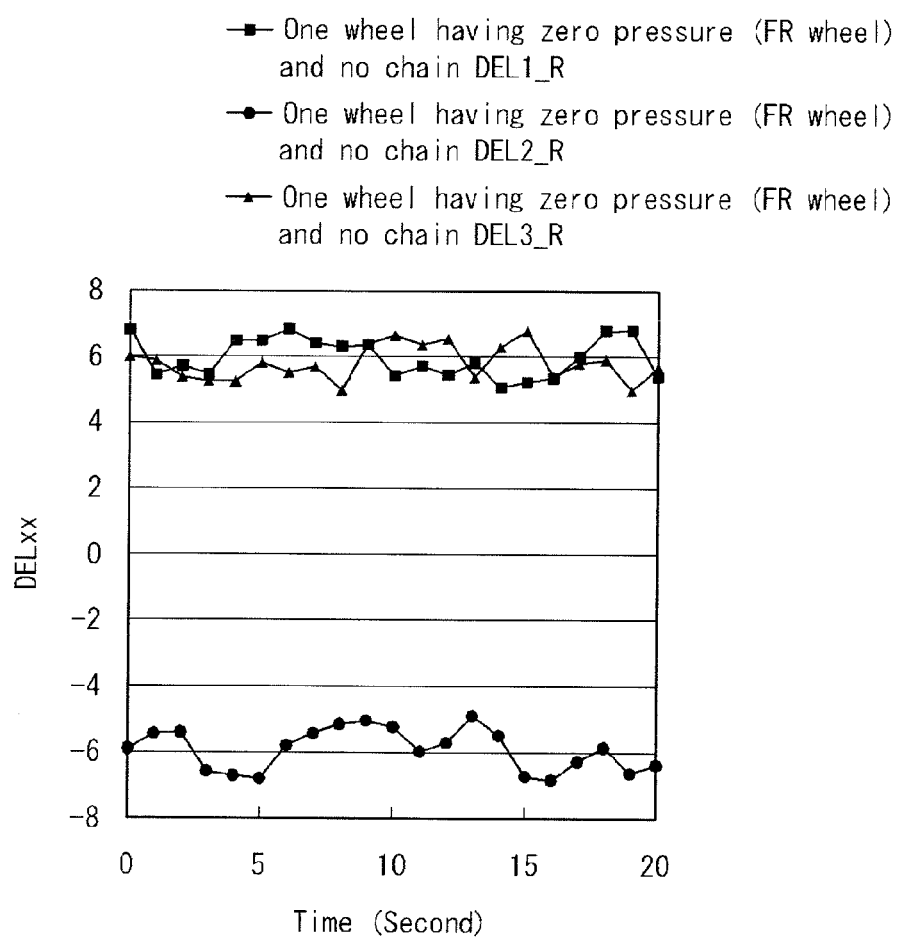
FIG. 5 illustrates a relation between DEL and time.

FIG. 3 to FIG. 5 illustrate experiment examples of the DEL1_R to DEL3_R. FIG. 3 shows values when four wheels have a normal internal pressure and a snow chain is not attached to any of the tires. FIG. 4 shows values when four wheels have a normal internal pressure and a snow chain is attached to the left rear wheel (RL wheel). FIG. 5 shows values when the right front wheel (FR wheel) has an internal pressure of zero and a snow chain is not attached to any of the tires. Table 2 shows the summary of the results of FIGS. 3 to 5. The experiment was performed by an FR vehicle with winter tires (225/55R16).

TABLE 2

| Time | Normal internal pressure and no chain | | | Normal internal pressure and one wheel having chain (RL wheel) | | | One wheel having zero pressure (FR wheel) and no chain | | |
|---|---|---|---|---|---|---|---|---|---|
| (second) | DEL1_R | DEL2_R | DEL3_R | DEL1_R | DEL2_R | DEL3_R | DEL1_R | DEL2_R | DEL3_R |
| 0 | 0 | 0 | 0.01 | 0.3 | 0.33 | −0.5 | 6.9 | −6 | 6 |
| 1 | 0.01 | 0.01 | −0.02 | 0.38 | 0.34 | −0.33 | 5.5 | −5.5 | 5.9 |
| 2 | 0 | 0 | 0.02 | 0.4 | 0.33 | −0.44 | 5.7 | −5.5 | 5.5 |
| 3 | −0.01 | −0.01 | 0 | 0.39 | 0.32 | −0.5 | 5.5 | −6.7 | 5.4 |
| 4 | −0.01 | −0.01 | 0.02 | 0.35 | 0.44 | −0.33 | 6.5 | −6.8 | 5.3 |
| 5 | −0.02 | 0 | 0 | 0.3 | 0.39 | −0.5 | 6.6 | −6.9 | 5.9 |
| 6 | 0 | −0.02 | −0.01 | 0.31 | 0.45 | −0.44 | 6.9 | −5.9 | 5.6 |
| 7 | 0.01 | 0.02 | −0.01 | 0.38 | 0.46 | −0.48 | 6.5 | −5.5 | 5.8 |
| 8 | 0.02 | 0 | 0 | 0.44 | 0.33 | −0.49 | 6.4 | −5.2 | 5.1 |
| 9 | −0.01 | −0.01 | 0 | 0.37 | 0.34 | −0.39 | 6.3 | −5.1 | 6.5 |
| 10 | −0.01 | −0.01 | −0.01 | 0.43 | 0.45 | −0.4 | 5.5 | −5.3 | 6.8 |
| 11 | 0.01 | −0.02 | 0.01 | 0.36 | 0.48 | −0.48 | 5.8 | −6 | 6.5 |
| 12 | 0.02 | 0.02 | 0.02 | 0.42 | 0.44 | −0.49 | 5.5 | −5.8 | 6.6 |
| 13 | 0.01 | 0 | 0 | 0.35 | 0.49 | −0.43 | 5.9 | −5 | 5.5 |
| 14 | 0.02 | 0 | −0.02 | 0.41 | 0.39 | −0.5 | 5.2 | −5.5 | 6.3 |
| 15 | 0 | −0.01 | 0.01 | 0.3 | 0.33 | −0.42 | 5.3 | −6.8 | 6.9 |
| 16 | −0.02 | −0.02 | −0.02 | 0.33 | 0.3 | −0.41 | 5.5 | −6.9 | 5.5 |
| 17 | 0.01 | 0.01 | 0.02 | 0.34 | 0.4 | −0.33 | 6 | −6.4 | 5.9 |
| 18 | 0 | 0.01 | 0 | 0.37 | 0.45 | −0.38 | 6.9 | −6 | 6 |
| 19 | 0.01 | 0.02 | 0.01 | 0.39 | 0.5 | −0.4 | 6.9 | −6.7 | 5.1 |
| 20 | 0 | 0 | −0.01 | 0.5 | 0.49 | −0.43 | 5.5 | −6.5 | 5.8 |

When a snow chain is attached to one wheel of four wheels at a normal internal pressure, the tire with the snow chain has a rotation velocity slower than those of other tires. However, a threshold value for identifying the tire having the slower rotation velocity is within a range from about 0.05 to 1 for example. As described above, the degree at which the rotation velocity is slower is different between a case where the one wheel has an internal pressure of zero and a case where the snow chain is attached to the one wheel. Thus, these cases can be clearly differentiated by changing the threshold value. When one wheel has an internal pressure of zero, the tire has a reduced dynamic loaded radius. Thus, the tire rotation velocity is generally increased. The present inventor has found that this rotation velocity also may be slower on the contrary at a more remarkable degree than in a case where a snow chain is attached to one wheel tire. The reason why the tire rotation velocity is much slower when one wheel has an internal pressure of zero may be considered that the zero internal pressure makes the tire tread to have a contact with the rim to cause friction that causes a slower rotation velocity.

As can be seen from FIGS. 3 to 5 and Table 2, when four wheels have a normal internal pressure and no snow chain is attached to any of the tires, DEL1_R, DEL2_R, and DEL3_R are substantially zero. However, when four wheels have a normal internal pressure and a snow chain is attached to the left rear wheel (RL wheel), DEL1_R and DEL2_R are within a range from 0.3 to 0.5 and DEL3_R is within a range from −0.33 to −0.5. When the right front wheel (FR wheel) has an internal pressure of zero and no snow chain is attached to any of the tires, DEL1_R and DEL3_R are within a range from 5.1 to 6.9 and DEL2_R is within a range from −5.1 to −6.9. This shows that the case where one wheel has an internal pressure of zero and the case where a snow chain is attached to one wheel show significantly different values of DEL1_R to DEL3_R. Thus, by setting a threshold value appropriately, a slower rotation velocity due to one wheel having an internal pressure of zero and a slower rotation velocity due to one wheel with a snow chain attached thereto can be clearly differentiated.

Next, in the present invention, when the tire identified (or tested) based on the rotation velocity is identical with the tire identified (or estimated) through the comparison of acceleration variations, it is judged that the tire has a decreased air pressure. As described above, one wheel of a tire having a decreased pressure is judged based not only on the judgment result by the acceleration variation but also on the judgment result by the rotation velocity (in this judgment, a case where a snow chain is attached to one wheel has a decreased rotation velocity due to the snow chain is excluded). Thus, a decreased pressure can be judged accurately.

A method for calculating a tire having a faster or slower rotation velocity than those of other tires is not limited to the method described with reference to Table 1. For example, another method also can be used according to which rotation velocities of four tires are compared to one another and, when the difference or ratio between the rotation velocity of one tire among the tires and the rotation velocities of the other three tires is larger or smaller than a predetermined threshold value, it can be judged that the one tire has a decreased air pressure. The degree at which the rotation velocity is slower is also different between a case where one wheel has an internal pressure of zero and a case where a snow chain is attached to one wheel. Thus, by changing the predetermined threshold value, there can be excluded a case where a snow chain is attached to one wheel has a slower tire rotation velocity due to the snow chain. In this case, the "predetermined threshold value" also can be calculated by performing a running experiment for example in advance.

What is claimed is:

1. An apparatus for detecting a decreased air pressure of a tire attached to a vehicle, comprising:
    a rotation velocity detection means for periodically detecting rotation velocities of tires of the respective wheels of the vehicle;
    an acceleration calculation means for calculating, based on rotation velocity information obtained from this rotation velocity detection means, accelerations of the respective tires;
    an acceleration variation calculation means for calculating, based on the accelerations of the respective tires calculated by the acceleration calculation means, acceleration variations of the respective tires;
    a comparison means for comparing the acceleration variations of the respective tires calculated by the acceleration variation calculation means;
    an estimation means for estimating, when a comparison result of the comparison means shows that an acceleration variation of a certain tire is greater than acceleration variations of the other tires, a decrease in air pressure of the certain tire;
    a test means for determining, based on the tire rotation velocity information of the respective wheels, a tire having a rotation velocity that is faster than the rotation velocities of the other tires or that is further slower than a predetermined reference; and
    a judgment means for judging, when a certain tire identified by the estimation means is identical with the tire identified by the test means, a decrease in air pressure of the certain tire.

2. The apparatus according to claim 1, wherein the predetermined reference is set as a reference at which the one wheel among four wheels has a tire rotation velocity slower than the rotation velocities of the other tires when the four wheels have a normal internal pressure and a snow chain is attached to a tire of the one wheel.

3. A method for detecting a decreased air pressure of a tire attached to a vehicle, comprising:
    a rotation velocity detection step of periodically detecting rotation velocities of tires of the respective wheels of the vehicle;
    an acceleration calculation step of calculating, based on rotation velocity information obtained in the rotation velocity detection step, accelerations of the respective tires;
    an acceleration variation calculation step of calculating, based on accelerations of the respective tires calculated in the acceleration calculation step, acceleration variations of the respective tires;
    a comparison step of comparing acceleration variations of the respective tires calculated in the acceleration variation calculation step;
    an estimation step of estimating, when the comparison by the comparison step shows that an acceleration variation of a certain tire is greater than acceleration variations of the other tires, a decrease in air pressure of the certain tire;
    a test step of determining, based on the tire rotation velocity information of the respective wheels, a tire having a rotation velocity that is faster than the rotation velocities of the other tires or that is further slower than a predetermined reference; and
    a judgment step of judging, when a certain tire identified in the estimation step is identical with the tire identified in the test step, a decrease in air pressure of the certain tire.

4. The method according to claim 3, wherein the predetermined reference is set as a reference at which the one wheel among four wheels has a tire rotation velocity slower than the rotation velocities of the other tires when the four wheels have a normal internal pressure and a snow chain is attached to a tire of the one wheel.

5. A program for causing, in order to detect a decreased air pressure of a tire attached to a vehicle, a computer to function as: an acceleration calculation means for calculating, based on rotation velocity information obtained from a rotation velocity detection means for periodically detecting rotation velocities of tires of the respective wheels of the vehicle, accelerations of the respective tires; an acceleration variation calculation means for calculating, based on the accelerations of the respective tires calculated by the acceleration calculation means, acceleration variations of the respective tires; a comparison means for comparing the acceleration variations of the respective tires calculated by the acceleration variation calculation means; an estimation means for estimating, when a comparison result of the comparison means shows that an acceleration variation of a certain tire is greater than acceleration variations of the other tires, a decrease in air pressure of the certain tire; a test means for determining, based on the tire rotation velocity information of the respective wheels, a tire having a rotation velocity that is faster than the rotation velocities of the other tires or that is further slower than a predetermined reference; and a judgment means for judging, when a certain tire identified by the estimation means is identical with the tire identified by the test means, a decrease in air pressure of the certain tire.

6. The program according to claim 5, wherein the predetermined reference is set as a reference at which the one wheel among four wheels has a tire rotation velocity slower than the rotation velocities of the other tires when the four wheels have a normal internal pressure and a snow chain is attached to a tire of the one wheel.

* * * * *